(No Model.)

A. BOTT.
HOSE COVERING.

No. 586,113. Patented July 13, 1897.

Witnesses.
Alex. Scott
M. L. Spencer.

Inventor.
Anton Bott
By Soulé & Co.
Attorneys

UNITED STATES PATENT OFFICE.

ANTON BOTT, OF DANVILLE, ILLINOIS.

HOSE-COVERING.

SPECIFICATION forming part of Letters Patent No. 586,113, dated July 13, 1897.

Application filed January 21, 1897. Serial No. 620,113. (No model.)

*To all whom it may concern:*

Be it known that I, ANTON BOTT, a citizen of the United States, residing at Danville, in the county of Vermilion and State of Illinois, have invented certain new and useful Improvements in Hose-Covering; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to hose and tubing; and it relates particularly to means for protecting hose which is used in positions liable to injury by reason of exposure to the weather or by rough usage or handling.

The object of the present invention is to provide means whereby rubber hose designed for such uses as for connecting the air-pipes of adjacent railway-cars may be protected and at the same time not have its usefulness for the purpose for which it is intended interfered with.

With this object in view the invention consists of the means for protecting hose, being a series of sleeves constructed substantially as hereinafter described and claimed.

The invention is illustrated in the accompanying drawings, in which—

Figure 1:
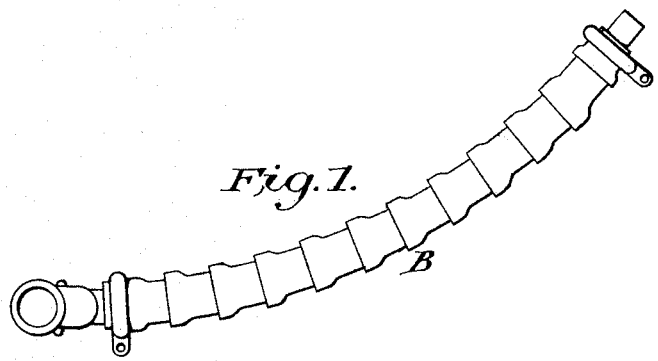
Figure 2:
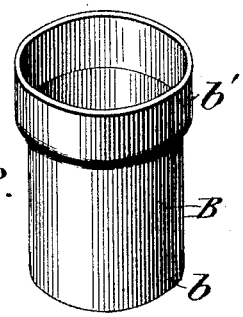
Figure 3:
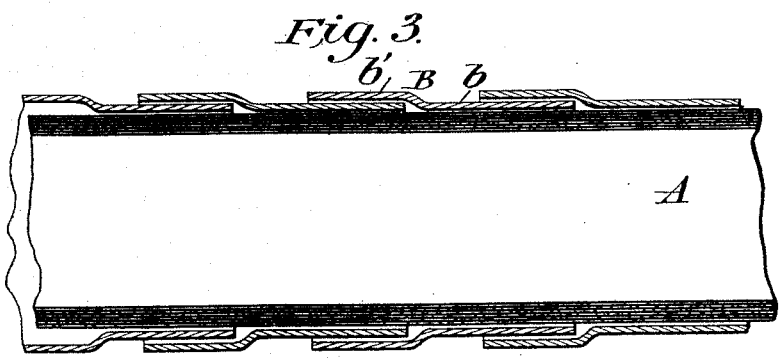

Figure 1 is a side view of a section of hose having my invention applied thereto. Fig. 2 is a perspective view of one of the sleeves or thimbles of the form contemplated by my invention, and Fig. 3 is a longitudinal section of a short piece of hose with the protectors applied.

In the drawings, A represents the tubing or hose to which the protector is to be applied. The hose or tubing here shown is of the ordinary so-called "rubber hose," being composed of canvas or the like, with alternate layers of vulcanized rubber.

The protectors by which, in accordance with my invention, the hose or tubing is covered are designated by the letter B. Each protector is composed of a main portion $b$ and an end portion $b'$. The main portion $b$ of each sleeve is cylindrical and of an inner diameter slightly less than the ordinary exterior diameter of the hose or tubing, so that when the sleeves are applied the tube is somewhat compressed, and thus the sleeves will be held in place by the resiliency, or, if necessary, the sleeves may be attached by cement interposed between the sleeve and the hose or tubing.

The enlarged end $b'$ of each sleeve or thimble is of a size to receive the main smaller portion of an adjacent sleeve and to allow a play between the parts of the respective sleeves or thimbles. At the point of juncture between the main and enlarged portions of each sleeve or thimble is a part $b^2$, which extends outward at an angle from the main portion to the enlarged portion. When the protectors are arranged in place on a hose or tubing, the end of the main portion of an adjacent sleeve or thimble is placed beneath the part $b^2$, and the incline of this part corresponds to the arc described by the end of sleeve beneath it in bending the pipe. Thus when tubing is provided with a series of sleeves or thimbles of the form described these sleeves or thimbles are arranged to project one within the other, as shown, the hose or tubing is protected throughout, and at the same time its flexibility is preserved.

The sleeves or thimbles may be composed of any desired material, such as metal, wood, paper, &c.; but on account of cheapness and strength I prefer to make them of metal.

Having thus described my invention, what I claim as new, and desire to secure by Letters Patent, is—

A protector for hose or tubing consisting of a series of sleeves or thimbles, each sleeve or thimble being composed of a main elongated cylindrical part and a short enlarged part whose walls are parallel to those of the main part, the juncture between the two being formed by a portion whose walls are at an angle to both the main and enlarged parts, the enlarged end of each sleeve or thimble receiving the end of the main portion of the adjacent sleeve or thimble, and the incline of the joining portion being at an angle corresponding to that described by the end of the main portion of an adjacent sleeve or thimble arranged adjacent to the joining portion, when the hose is bent, substantially as described.

In testimony whereof I affix my signature in presence of two witnesses.

ANTON BOTT.

Witnesses:
L. M. COOK,
W. E. FARNUM.